United States Patent
Krüger et al.

(10) Patent No.: US 7,310,395 B2
(45) Date of Patent: Dec. 18, 2007

(54) METHOD AND APPARATUS FOR CORRELATIVE ESTIMATION OF A MOBILE RADIO CHANNEL

(75) Inventors: Martin Krüger, München (DE); Ralf Heddergott, München (DE); Claudiu Krakowski, Gröbenzell (DE)

(73) Assignee: Infineon Technologies AG, Munich (DE)

( * ) Notice: Subject to any disclaimer, the term of this patent is extended or adjusted under 35 U.S.C. 154(b) by 686 days.

(21) Appl. No.: 10/833,579

(22) Filed: Apr. 28, 2004

(65) Prior Publication Data

US 2004/0218703 A1 Nov. 4, 2004

(30) Foreign Application Priority Data

Apr. 29, 2003 (DE) .............................. 103 19 334

(51) Int. Cl.
*H04B 1/10* (2006.01)
(52) U.S. Cl. .................................... 375/350
(58) Field of Classification Search ................ 375/350, 375/231, 340, 346, 344, 345
See application file for complete search history.

(56) References Cited

U.S. PATENT DOCUMENTS

2004/0121734 A1* 6/2004 Mattellini ................ 455/67.14

FOREIGN PATENT DOCUMENTS

DE 100 43 742 A1 4/2002
DE 101 37 675 A1 2/2003

OTHER PUBLICATIONS

"A Novel Channel Estimation Method: Blending Correlation and Least-Squares Based Approaches", Serdar Özen, Michael D. Zoltowski and Mark Fimoff, IEEE International Converence on Acoustics, Speech and Signal Processing ICASSP '02, May 13-17, 2002, vol. 3, pp. III-2281-III-2284.
"Channel Estimation for EGPRS Modems" Evgeny Yakhnich, 53$^{rd}$ Vehicular Technology Conference VTC 2001, May 6-9, 2001, vol. 1, pp. 419-422.

* cited by examiner

Primary Examiner—Chieh M. Fan
Assistant Examiner—Jaison Joseph
(74) Attorney, Agent, or Firm—Eschweiler & Associates, LLC

(57) ABSTRACT

In a method for correlative estimation of a mobile radio channel on the basis of a training sequence (TS) which is transmitted via the mobile radio channel, a sequence of P received symbols is correlated with a subsequence of length P of the training sequence, in order to calculate a first estimated channel coefficient ($\hat{h}_0^{(1)}$). Furthermore, the same sequence of P received symbols is correlated with at least some of the subsequences of the training sequence (TS) shifted through $\pm 1, \pm 2, \ldots, \pm(Lt-1)$ symbol positions, in order to calculate a number of further estimated channel coefficients ($\hat{h}_{\pm 1}^{(1)}, \hat{h}_{\pm 2}^{(1)}, \ldots, \hat{h}_{\pm(Lt-1)}^{(1)}$).

12 Claims, 5 Drawing Sheets

METHOD AND APPARATUS FOR CORRELATIVE ESTIMATION OF A MOBILE RADIO CHANNEL

REFERENCE TO RELATED APPLICATIONS

This application claims the benefit of the priority date of German application DE 103 19 334.0, filed on Apr. 29, 2003, the contents of which are herein incorporated by reference in their entirety.

FIELD OF THE INVENTION

The invention relates to a method and an apparatus for correlative estimation of a mobile radio channel.

BACKGROUND OF THE INVENTION

Mobile stations and base stations in a mobile radio system transmit and receive digitally modulated radio frequency signals. The received signals, which have been transmitted via the mobile radio channel, are subject to linear distortion as a result of reflection, scatter and diffraction of the radio frequency signals on obstructions such as buildings or the like. The distortion may be described by the channel impulse response. In order to allow equalization of the received signal, the receiver has to know the channel impulse response of the mobile radio channel. Since the channel characteristic is changing all the time, the receiver carries out rapidly repeated channel estimates in order to determine and update the channel impulse response. For this purpose, the transmitter emits a training sequence, which is known to the receiver, in each burst. The receiver compares the received training sequence with the (known) transmitted training sequence, and determines the channel impulse response from this comparison.

Figure 1:
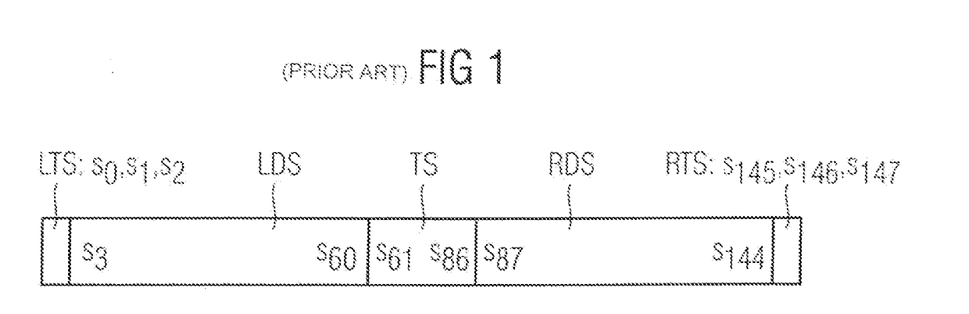
FIG. 1 shows the structure of a data burst which has a training sequence.

The GSM (Global System for Mobile Communication) mobile radio standard and its further development (EDGE (Enhanced Data Rates for GSM Evolution) are TDMA methods (Time Division Multiple Access). Both methods use signal transmission in bursts. The structure of a GSM burst is identical to the structure of an EDGE burst, and is illustrated in FIG. 1. The burst comprises 148 symbols $s_0, s_1, \ldots, s_{147}$. The first three symbols $s_1, s_1, s_2$ in the LTS (Left Tail Symbols) section are initial symbols. The following burst section LDS (Left Data Symbols) contains first data symbols $s_3, \ldots, s_{60}$. The training sequence TS is formed by the symbols $s_{61}, \ldots, s_{86}$. The RDS (Right Data Symbols) bust section contains data symbols $s_{87}, \ldots, s_{144}$. The RTS (Right Tail Symbols) section at the end of the burst contains a further three symbols $s_{145}, s_{146}, s_{147}$.

The symbols in the training sequence TS are always +1 or −1. In the case of GSM, this also applies to the other symbols, since GSM uses a two-value modulation alphabet (GMSK modulation). 8-PSK modulation (Phase Shift Keying) is defined in the EDGE Standard, whose symbol alphabet comprises eight different complex symbols. 8-PSK symbols are rotated incrementally through the angle $\phi = e^{j3\pi/8}$, while GMSK symbols are rotated incrementally through the angle $\phi = e^{j\pi/2}$. In this case, j denotes the imaginary unit. The equalization of 8-PSK symbols is thus considerably more susceptible to channel estimation errors than equalization of GMSK symbols.

Figure 2:
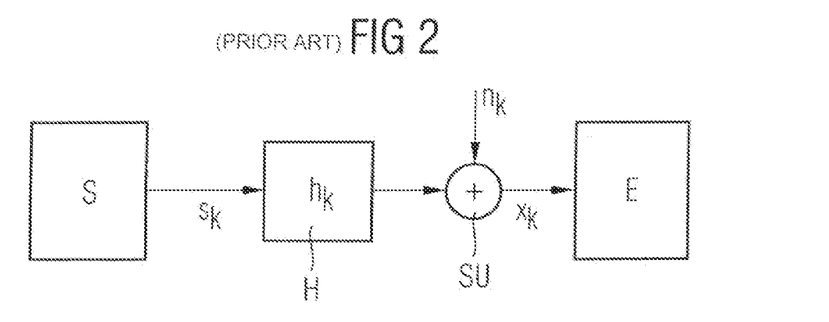
FIG. 2 shows a schematic illustration of a model of the physical transmission channel.

As is generally known, the mobile radio channel between a transmitter S and a receiver E can be modelled as a transmission filter H with channel coefficients $h_k$, as is shown in FIG. 2. The transmitter S feeds transmission symbols $s_k$ into the transmission channel, that is to say the transmission filter H. A model adder SU takes account of an additive noise contribution $n_k$, which is added to the transmission symbols $s_k$, which have been filtered by $h_k$, at the output of the transmission filter H.

The index k denotes the discrete time in time units of the symbol clock rate. The transmission signals $s_k$, which have been filtered by the transmission filter H and on which noise has been superimposed, are received by the receiver E as the received signal $x_k$. The received signal $x_k$ is obtained by convolution of the sequence of transmitted symbols with the channel impulse response plus the noise contribution:

$$x_k = \sum_{i=0}^{L} h_i s_{k-i} + n_k, \tag{1}$$

where L represents the order of the transmission channel which is modelled by the filter H.

Figure 3:
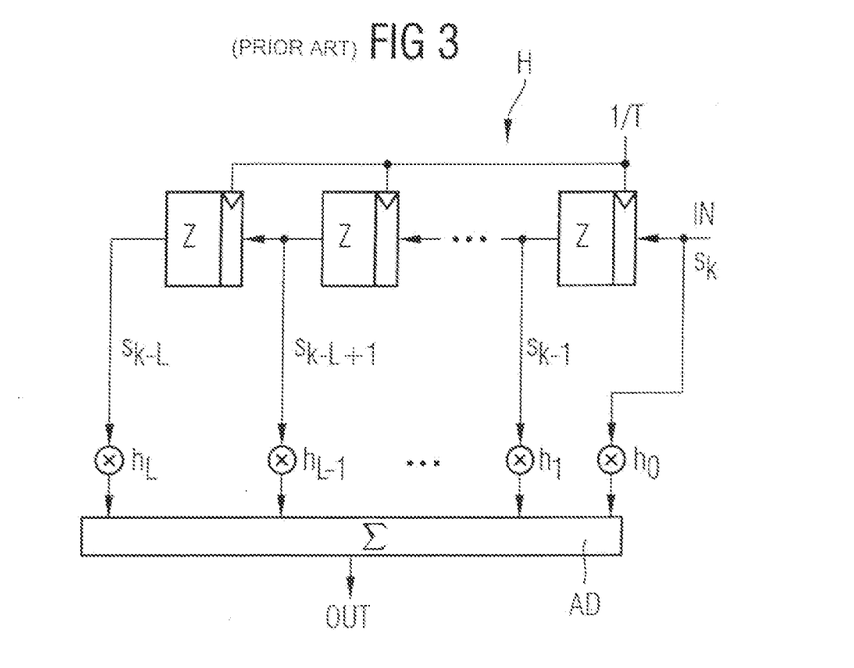
FIG. 3 shows the configuration of a model filter for modelling of the transmission channel.

FIG. 3 shows a channel model filter H of order L. The filter H has a shift register comprising L memory cells Z. Taps (a total of L+1 of them) are in each case located in front of and behind each memory cell Z and lead to multipliers which multiply the values of the symbols $s_k, s_{k-1}, \ldots, s_{k-L}$ inserted into the shift register via an input IN at the symbol clock rate $T^{-1}$ by the corresponding L+1 channel coefficients $h_0, h_1, \ldots, h_L$. L+1 also denotes the length of the channel impulse response. An output stage AD of the filter H adds the outputs of the L+1 multipliers, thus resulting in an output signal OUT as shown in equation 1.

For channel estimation, it is now assumed that the receiver is synchronized to the burst limits at least sufficiently accurately that L+1 elements of the carrier $$h = [h_{-L} \ldots h_{-1} h_0 h_1 \ldots h_L] \tag{2}$$

represent the channel impulse response. This means that the actual channel impulse response is formed by L+1 elements of this carrier, and that the other elements of the carrier are 0. If the synchronization with the burst limits is perfect, the first L channel coefficients $h_{-L}, \ldots, h_{-1} = 0$ and $h_0, h_1, \ldots, h_L$ of the carrier are the channel coefficients quoted in equation 1. In order to avoid an excessively complex mathematical representation, the same notation is used for the channel coefficients that occur in equation (1) and for the elements $h_{-L}, \ldots, h_L$ of the carrier h which are mentioned in equation (2).

If the symbols of the training sequence TS are regarded as transmitted symbols, the following relationship is obtained from equation (1) in conjunction with equation (2):

$$x_k = [s_{61+k+L} \ldots s_{61+k} \ldots s_{61+k-L}][h_{-L} \ldots h_0 \ldots h_L]^T + n_k \tag{3}$$

The received symbols in the time interval $[k_1, k_2]$ follow from $$\begin{bmatrix} x_{k_1} \\ \vdots \\ x_{k_2} \end{bmatrix} = \begin{bmatrix} s_{61+k_1+L} & \cdots & s_{61+k_1-L} \\ \vdots & \ddots & \vdots \\ s_{61+k_2+L} & \cdots & s_{61+k_2-L} \end{bmatrix} \begin{bmatrix} h_{-L} \\ \vdots \\ h_L \end{bmatrix} + \begin{bmatrix} n_{k_1} \\ \vdots \\ n_{k_2} \end{bmatrix} \tag{4}$$

The abbreviation $[s_{61} \ldots s_{86}]=[t_0 \ldots t_{25}]$ will be used in the following text for the training symbols. The training sequence TS can be represented by the vector $$t=[t_0\ t_1\ t_2 \ldots t_{15}\ t_0 \ldots t_9]^T \quad (5).$$

The superscript T (transposed) indicates that t is a column vector. The training sequence TS thus has a periodicity with respect to a subsequence of length P. For GSM/EDGE, P=16.

Furthermore, the training sequence TS has the characteristic that each vector element of length 16 (in general: of length P)

$$t_{16}(1)=[t_1 \ldots t_{1+15}]^T \quad (6)$$

is orthogonal with respect to non-trivial cyclic position shifts r in the interval t∈[1, Lt]. For GSM/EDGE Lt=6, that is to say $$R(1, 1+\tau)=[t_1, \ldots, t_{1+15}][t_{1+\tau}, \ldots, t_{1+\tau+15}]^T = 0 \text{ for } |\tau|\in[1, 6]. \quad (7)$$

Two approaches for estimation of the channel impulse response are known from the prior art. In the first approach, the channel impulse response is estimated using the least squares method (least square estimation: LSE) on the basis of equation (4). Equation (4) can be solved by the least squares method, since all of the elements in the matrix are known symbols from the training sequence TS. In order to avoid overdefinition of the equation system (4), the number of unknown channel coefficients $[h_{-L} \ldots h_L]$ of the carrier must be reduced to L+1 (the length of the channel impulse response). This requires more accurate synchronization, which necessitates additional complexity (it should be remembered that, before this synchronization, it is not known which of the L+1 elements of the channel impulse response carrier h represents the channel coefficients $[h_0 \ldots h_L]$).

A further method which is known from the prior art for estimation of the channel impulse response is correlation of the kernel $t_{16}(5.0)=[t_5 \ldots t_{20}]$ of the training sequence with the received symbols. The five elements on the left and the five elements on the right of the overall training sequence represent repetitions of the kernel of the training sequence. The correlation algorithm is:

$$\hat{h}_l = \frac{1}{16}[t_5 \cdots t_{20}] \begin{bmatrix} x_{5+l} \\ \vdots \\ x_{20+l} \end{bmatrix} \quad l = -L, \ldots, L \quad (8)$$

where $\hat{h}_l$ represent the 2L+1 estimated values for the parameters for the channel impulse response carrier h based on equation (2). The highest adjacent L+1 estimated values of the 2L+1 correlation values $\hat{h}_l$ represent the L+1 estimated channel coefficients based on equation (1). Correlative determination of the channel coefficients thus allows the synchronization of the receiver at the same time.

Figure 4:
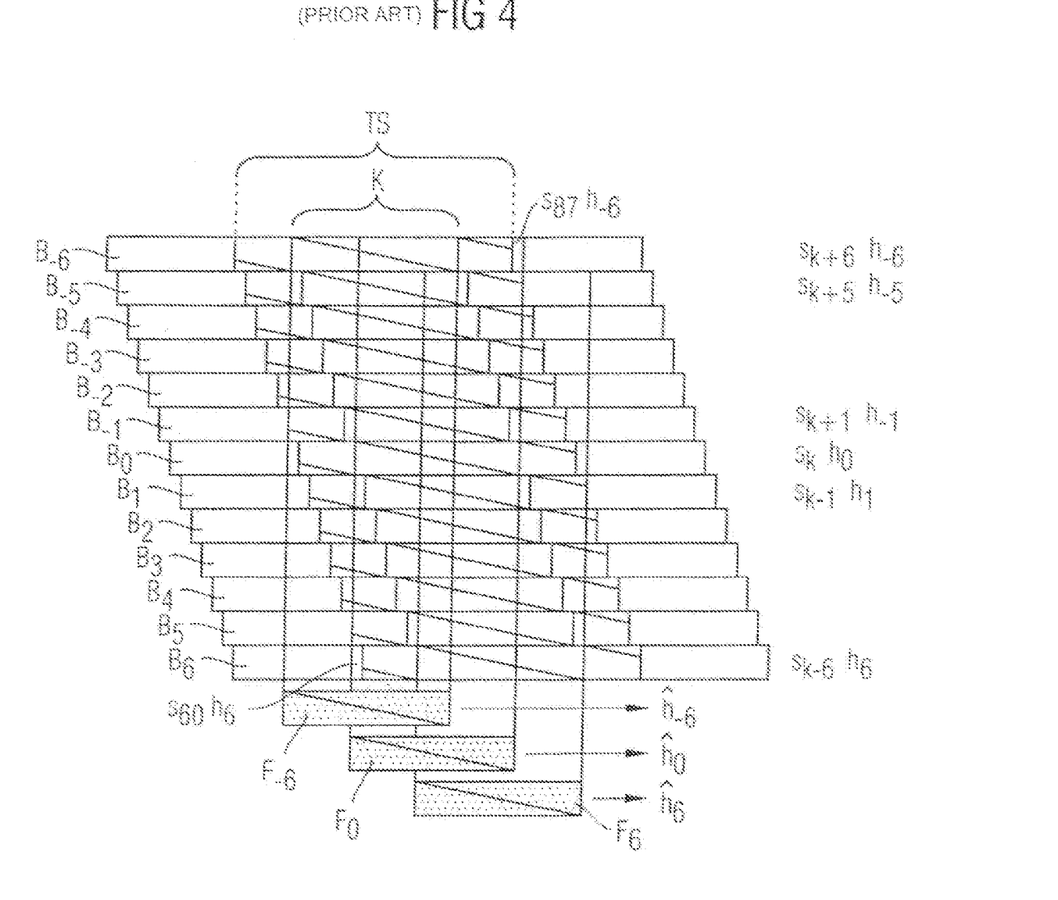
FIG. 4 shows a schematic illustration of the correlation process for determination of the channel impulse response according to the prior art.

According to equation (8), the correlation window runs over the received symbols, that is to say the distorted training sequence. FIG. 4 illustrates the conventional correlation process for L=6. The received burst is obtained from the superimposition of the 13 (in general: 2L+1) received burst components $B_{-6}, \ldots, B_0, \ldots, B_6$, which once again result, based on equation (3), from the transmitted burst by a respective shift through one symbol time period and weighting with the channel coefficients. The box with the diagonal line represents the respective kernel of the received training sequence. This kernel is denoted by the reference symbol K for the received burst component $B_{-6}$. The five data symbols, which are repetitions of a part of the kernel K, are located on each of the two sides of the kernel K. The reference symbol TS in this case denotes the training sequence of the received burst component $B_{-6}$.

The kernel of the undistorted training sequence is illustrated in the lower part of FIG. 4 for three different times (1=−6, 0, +6). Correlation of the entire received burst with the undistorted training sequence at the time 1=0 results in suppression of all the burst components transmitted via the channel except for the burst component $B_0$ that is weighted with the channel coefficient $h_0$. The correlation result is thus $16h_0$ (since the kernel has 16 symbols). The other channel coefficients are obtained by shifting the time window to the left or right.

FIG. 4 clearly shows that, when calculating $h_0$, the correlations with the burst components $B_{-6}$ and $B_6$ each include a multiplication by an unknown data symbol ($s_{87}$ and $s_{60}$, respectively). The other correlation results contain a large number of multiplications of undistorted symbols in the training sequence by unknown data symbols. This is particularly evident for the correlation windows $F_{-6}$ and $F_6$ which are used for the calculation of the channel coefficients $h_{-6}$ and $h_6$. In consequence, this results in significant correlation errors.

German Laid-Open Specification DE 100 43 742 A1 disclosed a method for correlative estimation of the channel impulse response, in which the correlation window runs over the received data symbols.

SUMMARY OF THE INVENTION

The invention is based on the object of specifying a method by means of which the channel impulse response can be estimated as accurately as possible. A further aim of the invention is to provide an apparatus for estimation of the channel impulse response as accurately as possible.

The invention is based on the fact that the training sequence which is transmitted via the mobile radio channel has the characteristic that a subsequence of a predetermined length P in the training sequence is orthogonal to the subsequences shifted through up to Lt subsequent elements. In the method according to the invention, a sequence of P received symbols is correlated with a subsequence of length P of the training sequence, in order to calculate a first estimated channel coefficient. The same sequence of P received symbols is then correlated with at least some of the subsequences of the training sequence shifted through ±1, ±2, . . . , ±(Lt−1) symbol positions, in order to calculate further estimated channel coefficients.

The method according to the invention thus differs from the known methods in that the correlation window does not run over the received symbols (all the correlations use the same received sequence of symbols), but the kernel of the training sequence is shifted on a position basis. This allows the channel impulse response to be calculated correlatively with considerably reduced errors than in the prior art.

One advantageous variant of the invention is for a first sequence (which is received one symbol earlier than the sequence of P received symbols) of P received symbols (that is to say obviously the received symbol sequence shifted through one symbol time period to the left) calculating the Lt-th channel coefficient, to be correlated with the subsequence of length P of the training sequence shifted through Lt−1 symbol positions in the direction of increasing indices.

This keeps the correlation error for calculation of the Lt-th correlation coefficient small. Further (Lt+1, Lt+2, . . . ) channel coefficients can also be calculated in a corresponding manner.

In an analogous manner, one advantageous method variant is characterized in that a second sequence (which is received one symbol later than the sequence of P received symbols) of P received symbols (that is to say obviously the symbol sequence shifted through one symbol time period to the right) is correlated with the subsequence of length P of the training sequence shifted through Lt−1 symbol positions in the direction of decreasing indices, in order to calculate the −Lt-th channel coefficient. Further (−Lt−1, −Lt−2, . . . ) channel coefficients can also be calculated in a corresponding manner.

In one advantageous application of the method according to the invention, the training sequence is the training sequence as defined in the GSM or EDGE Standard, which has a kernel length of P=16.

BRIEF DESCRIPTION OF THE DRAWINGS

The invention will be explained in the following text using an exemplary embodiment and with reference to the drawing, in which.

DETAILED DESCRIPTION OF THE INVENTION

First of all, an explanation will be given as to why a relatively large estimation error occurs in the correlative estimation of the channel impulse response as is known from the prior art and as illustrated in FIG. 4. According to equation (8), the expression for the estimated elements of the carrier of the channel impulse response is as follows:

$$\hat{h}_l = \frac{1}{16} \begin{bmatrix} t_5 & \cdots & t_{20} \end{bmatrix} \begin{bmatrix} s_{66+L+l} & \cdots & s_{66-L+l} \\ \vdots & \ddots & \vdots \\ s_{81+L+l} & \cdots & s_{81-L+l} \end{bmatrix} \begin{bmatrix} h_{-L} \\ \vdots \\ h_L \end{bmatrix} + z_{n,l}; \quad (9)$$

with the following definition being used in this case:

$$z_{n,l} = \frac{1}{16} \begin{bmatrix} t_5 & \cdots & t_{20} \end{bmatrix} \begin{bmatrix} n_{5+l} \\ \vdots \\ n_{20+l} \end{bmatrix} \quad l = -L, \ldots, L. \quad (10)$$

The correlation matrix $R^{(L)}$ is defined by the following expression:

$$R^{(L)} = \begin{bmatrix} r_0 & \cdots & r_{2L} \\ \vdots & \ddots & \vdots \\ r_{-2L} & \cdots & r_0 \end{bmatrix} \quad (11)$$

where $r_\lambda = \frac{1}{16} \begin{bmatrix} t_5 & \cdots & t_{20} \end{bmatrix} \begin{bmatrix} s_{66+\lambda} \\ \vdots \\ s_{81+\lambda} \end{bmatrix}.$ The correlation matrix $R^{(L)}$ has the dimension $(2L+1) \times (2L+1)$. Equation (8) can be written in vector notation by means of the correlation matrix $R^{(L)}$:

$$\hat{h} = \begin{bmatrix} \hat{h}_{-L} \\ \vdots \\ \hat{h}_L \end{bmatrix} = R^{(L)} \begin{bmatrix} h_{-L} \\ \vdots \\ h_L \end{bmatrix} + z_n = h + z; \quad (12)$$

with the vector $z_n$ in this case being defined by the expression $z_n = [z_{n,-L} \ldots z_{n,0} \ldots z_{n,L}]^T$.

The last term in equation (12) represents a definition of the error vector z, which expresses the error between the actual channel impulse response h and the estimated channel impulse response $\hat{h}$.

The error vector z is composed of two elements $$z = z_n + z_c. \quad (13)$$

The correlation errors that are produced by noise are represented by the vector $z_n$, while the vector $z_c$ represents the correlation error which is caused by the correlation of training symbols with unknown received data symbols. This results in:

$$z_c = R^{(L)}h - Ih = C^{(L)}h. \quad (14)$$

The last term in equation (14) defines the correlation error matrix $C^{(L)}$. I is the identity matrix.

Figure 5:
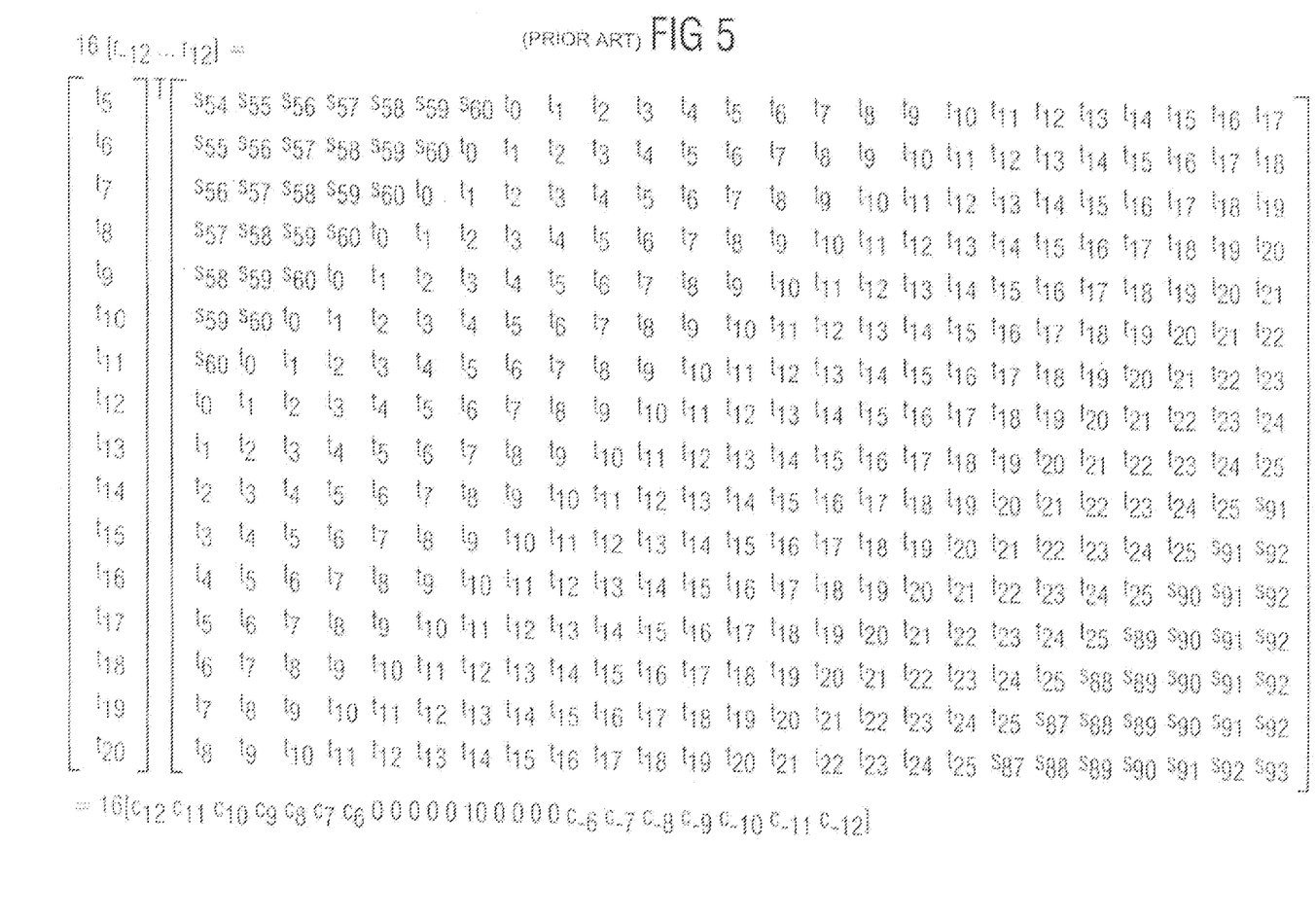
FIG. 5 shows the matrix equation for determination of the error matrix for correlation according to the prior art.

In order to find those elements of the correlation error matrix $C^{(L)}$ which do not disappear (value not equal to 0), the values $r_\lambda$ are first of all determined for $\lambda = -12, \ldots, 0, \ldots, 12$. This results in the expression illustrated in FIG. 5.

Figure 6:
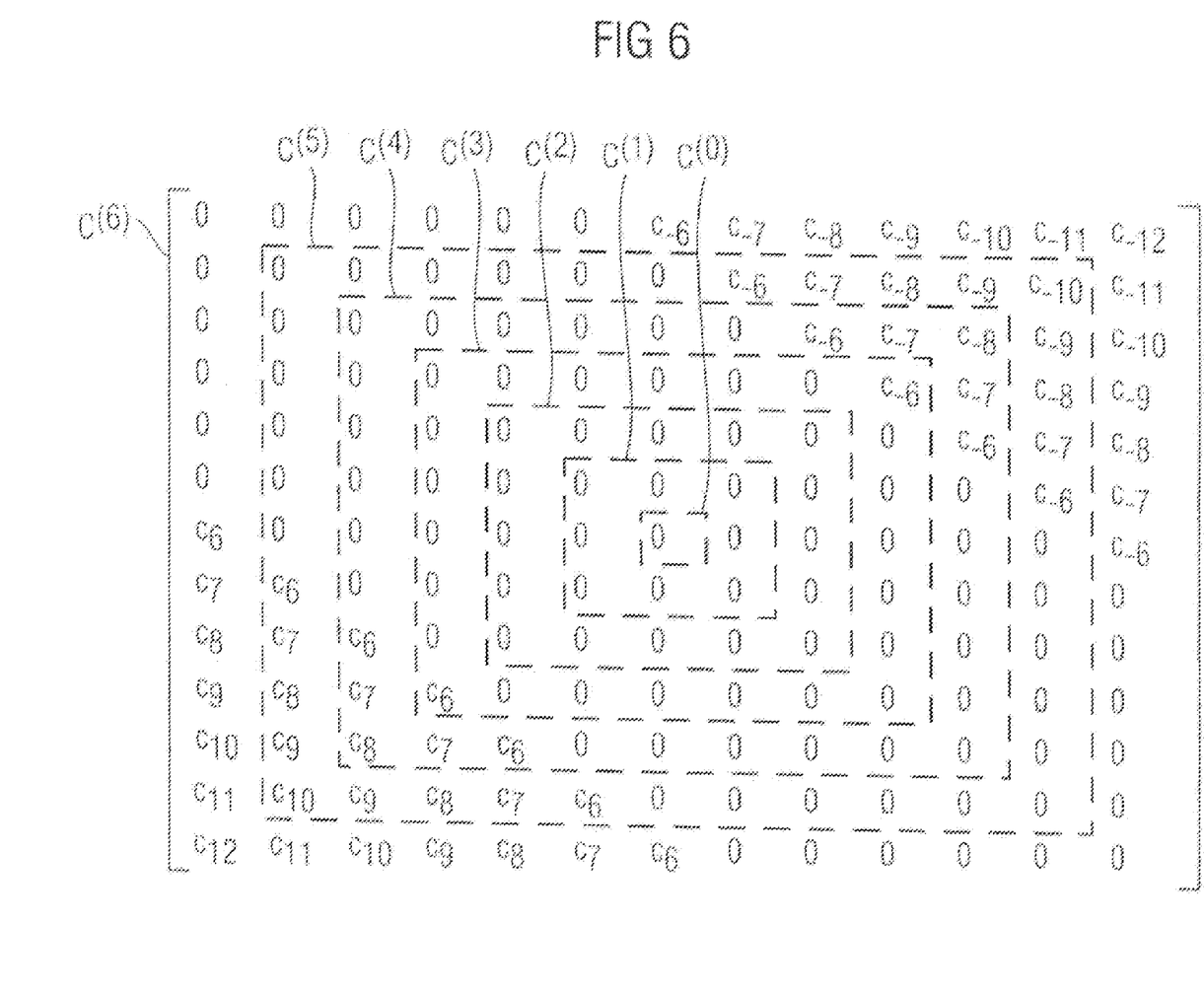
FIG. 6 shows the error matrix calculated using the equation in FIG. 5.

After subtraction of the identity matrix I, this results in the correlation error matrix $C^{(L)}$ illustrated in FIG. 6, where $L=0, 1, 2, \ldots, 6$.

Since each line in the correlation error matrix contains elements with a value that is not equal to 0, the error resulting from the correlation for L=6 is significant for most channel impulse responses. No correlation error occurs for L=2. Only small correlation errors occur for L=3, even when $h_{-L}$ or $h_L$ are values that are not equal to 0. It should be noted that, even if a longer training sequence were used (that is to say with received payload data being replaced by training sequence symbols), errors would occur as a result of the side areas of the autocorrelation function for time delays greater than five.

In the prior art, the errors caused by noise and correlation have to be removed by a second estimation step. The second estimation step is always based on an LSE calculation and requires the selection of L+1 channel parameters $[\hat{h}_{-L+1} \ldots \hat{h}_L]$ from the estimated values of the carrier for the estimated channel impulse response. The systematic errors which result from the correlation process can lead to an incorrect selection of the "correct" estimated channel parameters from the carrier. In this situation, the channel estimation cannot be improved any further by further data processing.

According to the invention, the correlations for estimation of the channel parameters are carried out using the following equation:

$$\hat{h}_l^{(1)} = \frac{1}{16} \begin{bmatrix} t_{5-l} & \cdots & t_{20-l} \end{bmatrix} \begin{bmatrix} x_5 \\ \vdots \\ x_{20} \end{bmatrix} \qquad l = -5, \ldots, 5. \tag{15}$$

The correlation window does not move over the received symbols but over the training sequence that is known in the receiver. The correlation vector $[t_{5-1} \ldots t_{20-1}]$ for l=−6 and l=6 is obtained from the training sequence. The data window in these situations is therefore in each case shifted by one position.

$$\hat{h}_{-6}^{(1)} = \frac{1}{16} \begin{bmatrix} t_{10} & \cdots & t_{25} \end{bmatrix} \begin{bmatrix} x_4 \\ \vdots \\ x_{19} \end{bmatrix} \tag{16}$$

$$\hat{h}_6^{(1)} = \frac{1}{16} \begin{bmatrix} t_0 & \cdots & t_{20} \end{bmatrix} \begin{bmatrix} x_6 \\ \vdots \\ x_{21} \end{bmatrix}$$

Further estimated channel coefficients $\hat{h}_{-7}^{(1)}, \hat{h}_{-8}^{(1)}, \ldots$ and $\hat{h}_7^{(1)}, \hat{h}_8^{(1)}, \ldots$ can also be calculated in an analogous manner using a data window which is in each case shifted by one further position to the left or right, respectively.

The following expression is obtained for the carrier for the estimated channel parameters:

$$\begin{bmatrix} \hat{h}_{-6}^{(1)} \\ \vdots \\ \hat{h}_6^{(1)} \end{bmatrix} = \frac{1}{16} \begin{bmatrix} t_{10} & t_{11} & t_{12} & \cdots & t_{25} & 0 & 0 \\ 0 & t_{10} & t_{11} & \cdots & t_{24} & t_{25} & 0 \\ \vdots & \vdots & \vdots & \ddots & \vdots & \vdots & \vdots \\ 0 & t_0 & t_1 & \cdots & t_{14} & t_{15} & 0 \\ 0 & 0 & t_0 & \cdots & t_{13} & t_{14} & t_{15} \end{bmatrix} \begin{bmatrix} x_4 \\ x_5 \\ \vdots \\ x_{20} \\ x_{21} \end{bmatrix} \tag{17}$$

$$\begin{bmatrix} \hat{h}_{-6}^{(1)} \\ \vdots \\ \hat{h}_6^{(1)} \end{bmatrix} = \frac{1}{16} \begin{bmatrix} t_{10} & t_{11} & t_{12} & \cdots & t_{25} & 0 & 0 \\ 0 & t_{10} & t_{11} & \cdots & t_{24} & t_{25} & 0 \\ \vdots & \vdots & \vdots & \ddots & \vdots & \vdots & \vdots \\ 0 & t_0 & t_1 & \cdots & t_{14} & t_{15} & 0 \\ 0 & 0 & t_0 & \cdots & t_{13} & t_{14} & t_{15} \end{bmatrix}$$

$$\begin{bmatrix} s_{71} & \cdots & s_{59} \\ \vdots & \ddots & \vdots \\ s_{88} & \cdots & s_{76} \end{bmatrix} \begin{bmatrix} h_{-6} \\ \vdots \\ h_6 \end{bmatrix} + z_n$$

where $$z_n = \frac{1}{16} \begin{bmatrix} t_{10} & t_{11} & t_{12} & \cdots & t_{25} & 0 & 0 \\ 0 & t_{10} & t_{11} & \cdots & t_{24} & t_{25} & 0 \\ \vdots & \vdots & \vdots & \ddots & \vdots & \vdots & \vdots \\ 0 & t_0 & t_1 & \cdots & t_{14} & t_{15} & 0 \\ 0 & 0 & t_0 & \cdots & t_{13} & t_{14} & t_{15} \end{bmatrix} \begin{bmatrix} n_4 \\ n_5 \\ \vdots \\ n_{20} \\ n_{21} \end{bmatrix}$$

The error resulting from the correlation process is:

$$z_c = \frac{1}{16} \begin{bmatrix} t_{10} & t_{11} & t_{12} & \cdots & t_{25} & 0 & 0 \\ 0 & t_{10} & t_{11} & \cdots & t_{24} & t_{25} & 0 \\ \vdots & \vdots & \vdots & \ddots & \vdots & \vdots & \vdots \\ 0 & t_0 & t_1 & \cdots & t_{14} & t_{15} & 0 \\ 0 & 0 & t_0 & \cdots & t_{13} & t_{14} & t_{15} \end{bmatrix} \begin{bmatrix} s_{71} & \cdots & s_{59} \\ \vdots & \ddots & \vdots \\ s_{88} & \cdots & s_{76} \end{bmatrix} \tag{18}$$

$$\begin{bmatrix} h_{-6} \\ \vdots \\ h_6 \end{bmatrix} - \begin{bmatrix} h_{-6} \\ \vdots \\ h_6 \end{bmatrix}$$

$$= \frac{1}{16} \begin{bmatrix} t_{10} & t_{11} & t_{12} & \cdots & t_{25} & 0 & 0 \\ 0 & t_{10} & t_{11} & \cdots & t_{24} & t_{25} & 0 \\ \vdots & \vdots & \vdots & \ddots & \vdots & \vdots & \vdots \\ 0 & t_0 & t_1 & \cdots & t_{14} & t_{15} & 0 \\ 0 & 0 & t_0 & \cdots & t_{13} & t_{14} & t_{15} \end{bmatrix}$$

$$\begin{bmatrix} t_{10} & t_9 & \cdots & s_{60} & s_{59} \\ t_{11} & t_{10} & \cdots & t_0 & s_{60} \\ t_{12} & t_{11} & \cdots & t_1 & t_0 \\ \vdots & \cdots & \ddots & \vdots & \vdots \\ t_{25} & t_{24} & \cdots & t_{14} & t_{13} \\ s_{87} & t_{25} & \cdots & t_{15} & t_{14} \\ s_{88} & s_{87} & \cdots & t_{16} & t_{15} \end{bmatrix} \begin{bmatrix} h_{-6} \\ \vdots \\ h_6 \end{bmatrix} - \begin{bmatrix} h_{-6} \\ \vdots \\ h_6 \end{bmatrix}$$

The correlation error matrix is:

$$C^{(6)} = \frac{1}{16} \begin{bmatrix} t_{10} & t_{11} & t_{12} & \cdots & t_{25} & 0 & 0 \\ 0 & t_{10} & t_{11} & \cdots & t_{24} & t_{25} & 0 \\ \vdots & \vdots & \vdots & \ddots & \vdots & \vdots & \vdots \\ 0 & t_0 & t_1 & \cdots & t_{14} & t_{15} & 0 \\ 0 & 0 & t_0 & \cdots & t_{13} & t_{14} & t_{15} \end{bmatrix} \tag{19}$$

$$\begin{bmatrix} t_{10} & t_9 & \cdots & s_{60} & s_{59} \\ t_{11} & t_{10} & \cdots & t_0 & s_{60} \\ t_{12} & t_{11} & \cdots & t_1 & t_0 \\ \vdots & \cdots & \ddots & \vdots & \vdots \\ t_{25} & t_{24} & \cdots & t_{14} & t_{13} \\ s_{87} & t_{25} & \cdots & t_{15} & t_{14} \\ s_{88} & s_{87} & \cdots & t_{16} & t_{15} \end{bmatrix} - I$$

-continued $$= \begin{bmatrix} 0 & 0 & 0 & \cdots & 0 & c_{-11} & c_{-12} \\ c_1 & 0 & 0 & \cdots & 0 & 0 & c_{-11} \\ c_2 & 0 & 0 & \cdots & 0 & 0 & c_{-10} \\ \vdots & \vdots & \vdots & \ddots & \vdots & \vdots & \vdots \\ c_{10} & 0 & 0 & \cdots & 0 & 0 & c_{-2} \\ c_{11} & 0 & 0 & \cdots & 0 & 0 & c_{-1} \\ c_{12} & c_{11} & 0 & \cdots & 0 & 0 & 0 \end{bmatrix}$$

The elements with a value that is not equal to 0 in the correlation error matrix are listed below:

$$16c_{-12} = [t_{10} \cdots t_{25}][s_{59} s_{60} t_0 \cdots t_{13}]^T \quad (20)$$

$$16c_{-11} = [t_{10} \cdots t_{25}][s_{60} t_0 \cdots t_{14}]^T$$

$$16c_{-1} = [t_0 \cdots t_{15}][s_{60} t_0 \cdots t_{14}]^T$$

$$16c_{-1} = [t_{10} \cdots t_{25}][t_{11} \cdots t_{25} s_{87}]^T$$

$$16c_{-11} = [t_0 \cdots t_{15}][t_{11} \cdots t_{25} s_{87}]^T$$

$$16c_{-12} = [t_0 \cdots t_{15}][t_{12} \cdots t_{25} s_{87} s_{88}]^T$$

The correlation error matrix thus has the following characteristics:

The channel parameter values which are estimated for the carrier section $[h_{-4} \ldots h_{+4}]$ have no correlation-dependent error.

The estimated value for $h_{-5}$ has a correlation-dependent error only when $h_{+6}$ is not equal to 0. In this situation, the actual value of $h_{-5}$ is the value 0 and is not within the channel impulse response comprising seven channel parameters.

The same applies to the estimated value of $h_5$ with respect to $h_{-6}$.

The same applies to $h_{-6}$ with respect to $h_{+5}$ and $h_{+6}$.

The same applies to $h_{+6}$ with respect to $h_{-5}$ and $h_{-6}$.

Figure 7:
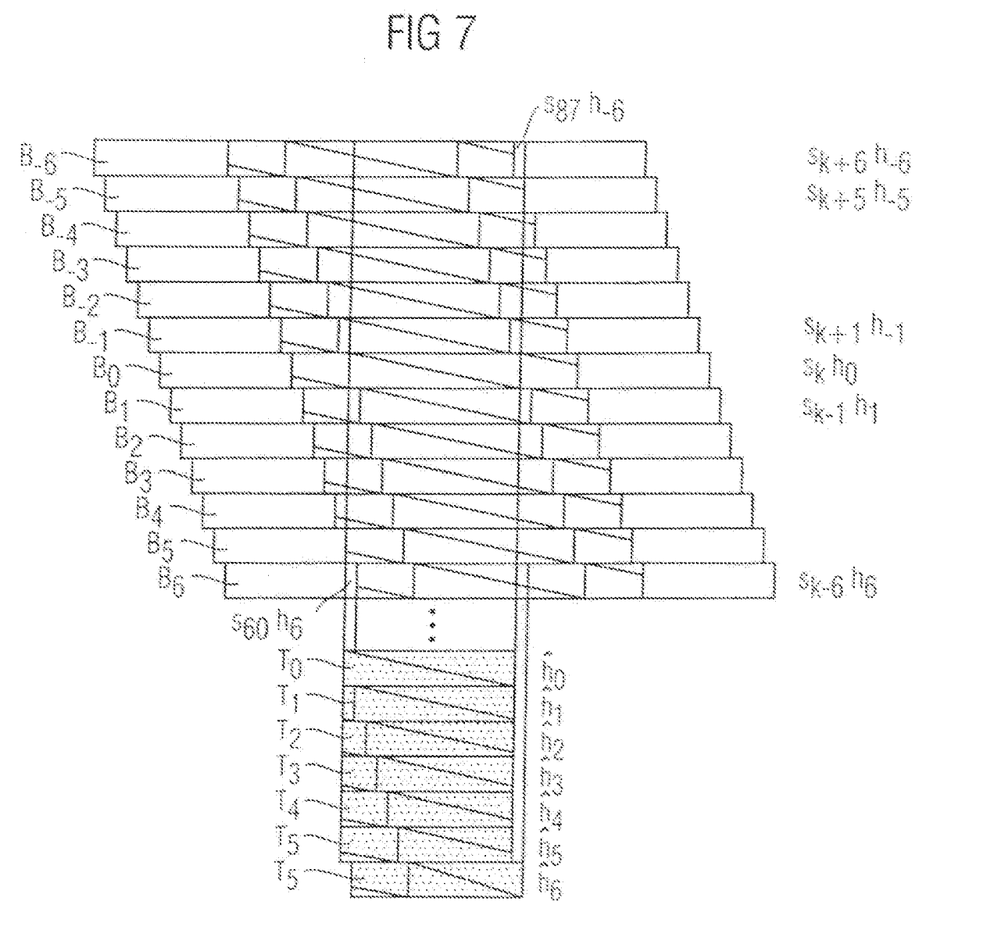
FIG. 7 shows a schematic illustration of the correlation process for determination of the channel impulse response according to the invention.

FIG. 7 illustrates the correlation method according to the invention for estimation of the channel impulse response. As in FIG. 4, the received burst which comprises the superimposed burst components $B_6, \ldots, B_0, \ldots, B_6$ is shown in the upper area of FIG. 7. The correlation for determination of the channel parameter $h_0$ is carried out in the same way as in FIG. 4, that is to say by multiplication of the kernel $T_0$ of the form $[t_5 \ldots t_{20}]$ by the superimposed burst, with the correlation result being $16h_0$. At the same time, the burst based on equation (14) is also correlated with the cyclically shifted kernels $[t_{5-l} \ldots t_{20-l}]$, where $l=-5, -4, -3, -2, -1, 1, 2, 3, 4, 5$. FIG. 7 shows the cyclically shifted kernels $T_1$ of the form mentioned above for $l=1, 2, 3, 4, 5$. Multiplication by an unknown, distorted data value $s_{87}h_{-6}$ or $s_{60}h_6$ takes place only in the event of multiplications of the burst component $B_{-6}$ and of the burst component $B_6$ by the cyclically shifted kernels $T_1$, $l=-5, \ldots, 5$. Otherwise, only known training symbols are multiplied by training symbols weighted by channel parameters.

The same cyclically shifted kernel $T_5$ of the training sequence as is also used for calculation of the estimated channel parameter $h_5$ is used for calculation of the estimated channel parameter $h_6$. However, the correlation is carried out one time step later than the correlations for $l=-5, \ldots, 5$.

The correlative calculation of a channel impulse response as illustrated in FIG. 7 can be extended for values of L>6, although greater correlation-dependent errors will then have to be accepted in the calculation of the further channel coefficients.

After determination of all the channel parameters $\hat{h}_l^{(1)}$ of the carrier for the channel impulse response according to equations (15) and (16), the actual channel parameters (a quantity of L+1) can be identified as those adjacent L+1 estimated parameters of the carrier for the channel impulse response which have the greatest correlation results.

Figure 8:
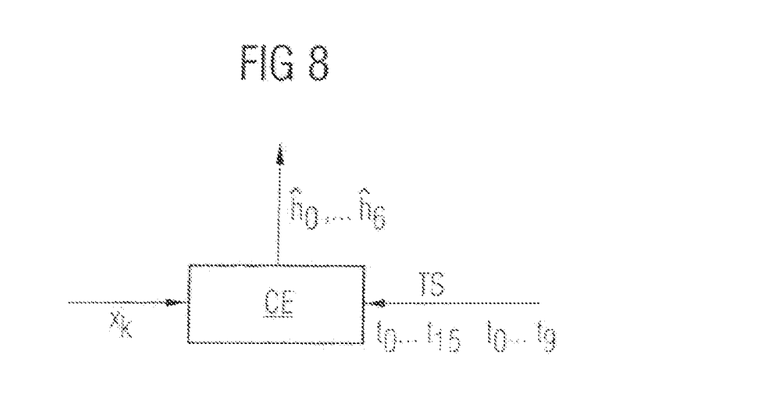
FIG. 8 shows a schematic illustration of a channel estimator according to the invention.

FIG. 8 shows a schematic illustration of a correlative channel estimator CE according to the invention. The channel estimator CE is supplied with the sample values $x_k$ from the received burst in the area of the training sequence, see FIG. 7. The training sequence (equation (5)) is known to the channel estimator CE. The channel estimator CE produces estimated values $\hat{h}_0, \ldots, \hat{h}_6$ for the actual channel parameters $h_0, \ldots, h_6$ as the result of the channel estimation.

The channel estimator CE may be produced either in the form of hardware or in the form of a firmware solution by means of a DSP (Digital Signal Processor). An implementation in firmware appears to be preferable owing to the complex processing procedure and the need to carry out a large number of multiplication and accumulation operations.

The invention claimed is:

1. A method for correlative estimation of a mobile radio channel on the basis of a training sequence (TS) which is transmitted via the mobile radio channel and has the characteristic that a subsequence of a predetermined length P of the training sequence is orthogonal to subsequences of the training sequence shifted through up to Lt subsequent elements, wherein P and Lt are integers, comprising:
   (1) correlating a sequence of P received symbols with the subsequence of length P of the training sequence to calculate a first estimated channel coefficient ($\hat{h}_0^{(1)}$);
   (2) correlating the same sequence of P received symbols with at least some of the subsequences of the training sequence (TS) shifted through $\pm 1, \pm 2, \ldots, \pm(Lt-1)$ symbol positions to calculate a number of further estimated channel coefficients ($\hat{h}_{\pm 1}^{(1)}, \hat{h}_{\pm 2}^{(1)}, \ldots, \hat{h}_{\pm(Lt-1)}^{(1)}$), wherein a correlation window defined by the subsequence of the predetermined length P moves over the training sequence in act (2); and
   (3) using the estimated channel coefficients ($\hat{h}_{\pm 1}^{(1)}, \hat{h}_{\pm 2}^{(1)}, \ldots, \hat{h}_{\pm(Lt-1)}^{(1)}$) to update a channel impulse response of the mobile radio channel.

2. The method of claim 1, further comprising correlating a first sequence of P received symbols received one or more symbols earlier than the sequence of P received symbols with the subsequence of length P of the training sequence (TS) shifted through Lt-1 symbol positions in the direction of increasing indices to calculate a first additional channel coefficient ($\hat{h}_{Lt}^{(1)}$) or to calculate two or more second additional channel coefficients.

3. The method of claim 1, further comprising correlating a second sequence of P received symbols received one or more symbols later than the sequence of P received symbols with the subsequence of length P of the training sequence (TS) shifted through Lt-1 symbol positions in the direction of decreasing indices to calculate a second additional channel coefficient ($\hat{h}_{-Lt}^{(1)}$) or to calculate two or more second additional channel coefficients.

4. The method of claim 1, wherein the training sequence comprises the training sequence defined in the GSM or EDGE Standard with P=16.

5. The method of claim 4, wherein Lt=6.

6. A correlator in a receiver for correlative estimation of a mobile radio channel on the basis of a training sequence (TS) which is transmitted via the mobile radio channel and has the characteristic that a subsequence of a predetermined length P of the training sequence is orthogonal to subsequences of the training sequence shifted through up to Lt subsequent elements, wherein P and Lt are integers, wherein the correlator is i configured to correlate a sequence of P received symbols with the subsequence of length P of the training sequence to calculate a first estimated channel coefficient ($\hat{h}_0^{(1)}$), and further configured to correlate the same sequence of P received symbols with at least some of the subsequences of the training sequence shifted through ±1, ±2, ..., ±(Lt-1) symbol positions to calculate a number of further estimated channel coefficients ($\hat{h}_{\pm 1}^{(1)}, \hat{h}_{\pm 2}^{(1)}, \hat{h}_{\pm 3}^{(1)}, \ldots, \hat{h}_{\pm(L-1)}^{(1)}$), wherein a correlation window defined by the subsequence of the predetermined length P moves over the training sequence.

7. The correlator of claim 6, wherein the correlator is further configured to update a channel impulse response of the mobile radio channel.

8. A method of equalizing a received signal in a mobile radio system, comprising:

receiving a signal transmission in a burst type format, wherein the signal transmission comprises a training sequence, and wherein the training sequence comprises a plurality of bits having a property that a first subsequence thereof having a length P is orthogonal to subsequences of the training sequencing having the length P that are shifted with respect thereto up to an amount Lt, wherein P and Lt are integers;

correlating a sequence of P received symbols from the signal transmission with the first subsequence of the training sequence to calculated a first estimated channel coefficient;

shifting a correlation window, having a size P, with respect to the first subsequence up or down along the training sequence an amount less than Lt to establish a second subsequence of the training sequence;

correlating the sequence of P received symbols from the signal transmission with the second subsequence to calculate a second estimated channel coefficient;

using the estimated channel coefficients to update a channel impulse response of the mobile radio system; and using the updated channel impulse response for equalization of received signal transmissions.

9. The method of claim 8, wherein shifting the correlation window with respect to the first subsequence comprises moving the correlation window in a first direction along the training sequence one symbol position at a time up to and not including an amount Lt symbol positions.

10. The method of claim 9, further comprising correlating the sequence of P received symbols with the subsequences associated with each shifted correlation widow, respectively, thereby generating a plurality of estimated channel coefficients.

11. The method of claim 8, wherein shifting the correlation window with respect to the first subsequence comprises moving the correlation window in a second direction along the training sequence one symbol position at a time up to and not including an amount Lt symbol positions, wherein the first and second directions are opposite directions.

12. The method of claim 9, further comprising correlating the sequence of P received symbols with the subsequences associated with each shifted correlation widow, respectively, thereby generating a plurality of estimated channel coefficients.

* * * * *